United States Patent
Gramsch

(10) Patent No.: US 9,540,872 B2
(45) Date of Patent: Jan. 10, 2017

(54) ACTUATING DEVICE, ESPECIALLY FOR A SHADING SYSTEM, FOR ACTUATION WITH A STRING ELEMENT

(71) Applicant: Hunter Douglas Industries Switzerland GmbH, Lucerne (CH)

(72) Inventor: Wilfried Gramsch, Beverstedt (DE)

(73) Assignee: Hunter Douglas Industries Switzerland GmbH, Lucerne (CH)

( * ) Notice: Subject to any disclaimer, the term of this patent is extended or adjusted under 35 U.S.C. 154(b) by 0 days.

(21) Appl. No.: 14/845,657

(22) Filed: Sep. 4, 2015

(65) Prior Publication Data
US 2016/0069131 A1    Mar. 10, 2016

(30) Foreign Application Priority Data
Sep. 8, 2014 (DE) ................. 10 2014 012 963

(51) Int. Cl.
| | |
|---|---|
| *E05F 11/00* | (2006.01) |
| *E06B 9/36* | (2006.01) |
| *E06B 9/42* | (2006.01) |
| *F16H 19/06* | (2006.01) |
| *E06B 9/326* | (2006.01) |

(52) U.S. Cl.
CPC ............. *E06B 9/368* (2013.01); *E06B 9/42* (2013.01); *F16H 19/06* (2013.01); *E06B 2009/3265* (2013.01); *E06B 2009/425* (2013.01)

(58) Field of Classification Search
CPC .... E06B 2009/3265; E06B 9/32; E06B 9/322; E06B 9/326

USPC .......................... 160/188, 193, 319, 321, 320
See application file for complete search history.

(56) References Cited

U.S. PATENT DOCUMENTS

| | | | | |
|---|---|---|---|---|
| 4,909,298 A | * | 3/1990 | Langhart | A47H 11/02 160/178.1 R |
| 6,116,325 A | * | 9/2000 | Colson | E06B 9/32 160/321 |
| 6,749,000 B2 | * | 6/2004 | Bohlen | E06B 9/322 160/178.1 R |

(Continued)

FOREIGN PATENT DOCUMENTS

| | | | | |
|---|---|---|---|---|
| DE | 102014004935 | * | 10/2015 | ............. E06B 9/326 |
| EP | 2574717 A1 | * | 4/2013 | ............. F16H 35/00 |

(Continued)

*Primary Examiner* — Katherine Mitchell
*Assistant Examiner* — Johnnie A Shablack
(74) *Attorney, Agent, or Firm* — McGlew and Tuttle, P.C.

(57) ABSTRACT

An actuating device (10) actuates a shading system with a string element (44). An unintended detachment of a first partial structure (12) from a second partial structure (13) in the intended use is avoided as much as possible and a detachment of the first partial structure (12) from the second partial structure (13) is possible with low forces for avoiding injuries. The actuating device (10) includes a first coupling element (26, 27) that in the released position does not mesh with a second coupling element (28, 29), and in the locking position, with an interaction of the first coupling element (26, 27) with the second coupling element (28, 29), a detachment of the first partial structure (12) from the second partial structure (13) is prevented because of a positive-locking connection between the first coupling element (26, 27) and the second coupling element (28, 29).

20 Claims, 6 Drawing Sheets

(56) References Cited

U.S. PATENT DOCUMENTS

| | | | | |
|---|---|---|---|---|
| 8,336,598 B1* | 12/2012 | Chang | ................... | E06B 9/56 |
| | | | | 160/177 V |
| 2011/0048657 A1* | 3/2011 | Tung | ................... | E06B 9/42 |
| | | | | 160/319 |
| 2012/0017399 A1* | 1/2012 | Huang | ................... | E06B 9/326 |
| | | | | 24/115 F |
| 2015/0197983 A1* | 7/2015 | Nicolosi | ................... | E06B 9/264 |
| | | | | 160/107 |
| 2016/0069131 A1* | 3/2016 | Gramsch | ................... | F16H 19/06 |
| | | | | 160/188 |

FOREIGN PATENT DOCUMENTS

| | | | | | |
|---|---|---|---|---|---|
| EP | | 2927416 A1 | * 10/2015 | ............. | E06B 9/326 |
| GB | | 2516062 A | * 1/2015 | ............. | E06B 9/326 |
| GB | WO 2015185728 A1 | | * 12/2015 | ............. | E06B 9/326 |
| NL | WO 2012125036 A1 | | * 9/2012 | ............. | E06B 9/325 |

* cited by examiner

US 9,540,872 B2

ACTUATING DEVICE, ESPECIALLY FOR A SHADING SYSTEM, FOR ACTUATION WITH A STRING ELEMENT

CROSS REFERENCE TO RELATED APPLICATIONS

This application claims the benefit of priority under 35 U.S.C. §119 of German Patent Application DE 10 2014 012 963.2 filed Sep. 8, 2014, the entire contents of which are incorporated herein by reference.

FIELD OF THE INVENTION

The present invention pertains to an actuating device, especially for a shading system, for actuation with a string element, which is associated with a first partial structure, which is detachably fastened to a second partial structure, whereby the first partial structure is detachable from the second partial structure with a simultaneous pull on a first strand and on a second strand of the string element when a predetermined pulling force is exceeded, and with at least one first coupling element, which is associated with the first partial structure and which meshes, in a locking position, with a second coupling element associated with the second partial structure, whereby the first partial structure is pivoted into the locking position with a pull on a single strand, and the first partial structure is pivoted with a simultaneous pull on the two strands of the string element into a released position for detaching the first partial structure from the second partial structure, whereby the first partial structure and the second partial structure are connected to one another by means of a detachable connection in the released position.

BACKGROUND OF THE INVENTION

Such an actuating device is known from U.S. Pat. No. 6,116,325 A. In this case, webs are formed from a flexible material, whereby, with a simultaneous pull on the two strands with a sufficiently great force, the webs are bent apart in such a way that the first partial structure is detached from the second partial structure. With a pull on a single strand, the first partial structure is pivoted in such a way that the first coupling element of a web of the first partial structure comes to rest on a second coupling element of the second partial structure. Consequently, a bending upward of the respective web and thus a detachment of the coupling elements lying on one another is prevented.

The disadvantage in this connection is that an unintentional bending upward of the webs or a detachment of the first and second coupling elements in the locking position cannot be completely ruled out. Further, it is disadvantageous that the webs or the first coupling elements for detaching the first partial structure from the second partial structure have to be bent away from each other. In this connection, there is the risk that the first partial structure is not detached from the second partial structure in a timely manner or only with an unduly great force. Furthermore, the use of flexible or elastic webs may lead to material fatigue and in the worst case to a material rupture. Consequently, there is the risk that the actuating device may not perform its intended function permanently.

Furthermore, it is known that the string element in shading systems with free-hanging string elements, especially when this string element forms a free-hanging loop, must be loosened with a pulling weight of 6 kg or more to meet the DIN standard EN 13120 in order to avoid an injury to a person or a child, especially because of strangulation.

SUMMARY OF THE INVENTION

A basic object of the present invention is to further develop an actuating device of the type mentioned in the introduction in such a way that, on the one hand, the risk of an unintentional detachment of the first partial structure from the second partial structure in the intended use can be avoided as much as possible and, on the other hand, a detachment of the first partial structure from the second partial structure is made possible with as low as possible forces to avoid injuries. In particular, a basic object of the present invention is that, on the one hand, an as high as possible pulling force can be transmitted with a selective actuation of the first strand or the second strand without the risk of an undesired separation of the two partial structures, and, on the other hand, a presettable, as low as possible pulling force for detaching the two partial structures is sufficient with a simultaneous pull on the first strand and the second strand. The risk of material fatigue shall preferably be reduced.

Basic objects of the present invention are accomplished by an actuating device of the type mentioned in the introduction, which is characterized in that the first coupling element does not mesh with the second coupling element in the released position, and in that with an interaction of the first coupling element with the second coupling element in the locking position, a detachment of the first partial structure from the second partial structure is prevented because of a positive-locking connection between the first coupling element and the second coupling element.

It is advantageous in this case that the first coupling element interacts with the second coupling element only in the locking position, as a result of which the connection between the first partial structure and the second partial structure is reinforced. Consequently, higher forces can be transmitted without the risk of an undesired detachment with a pull on a single strand in the locking position, in which the first partial structure is pivoted in relation to the second partial structure. Especially in the released position, the first coupling element is arranged in a functionless and/or contactless manner in relation to the second partial structure. Thus, the first coupling element cannot prevent a detachment of the first partial structure from the second partial structure in the released position. Consequently, the first coupling element and/or the second coupling element may be designed, for example, as solid and/or rigid. In particular, the first coupling element is fastened to the first partial structure and/or the second coupling element is fastened to the second partial structure.

Because of a, for example, rigid design of the first coupling elements and of the second coupling elements, an especially exclusively positive-locking connection can be established, as a result of which an especially loadable connection can be established between the first partial structure and the second partial structure with a pull on a single strand. In particular, the entire first partial structure and/or the entire second partial structure, preferably except for the components for forming a detachable connection in the released position, has a rigid design. Consequently, the risk of material fatigue can be reduced considerably. Moreover, because of the positive-locking connection between the first partial structure and the second partial structure with a pull on a single strand, the risk of an undesired detachment of the first partial structure from the second partial structure can be practically entirely avoided during normal use.

The first partial structure can especially be moved into a locking position with a pulling force and/or a pull only on a single strand. Thus, during a usual actuation of the actuating device for normal operation, because of a pulling on the first strand or the second strand, a positive-locking connection can be established between the first partial structure and the second partial structure. Consequently, high pulling forces can be transmitted, whereby the risk of an unintentional separation of the connection between the first partial structure and the second partial structure is considerably reduced. The pulling force acting on the first strand and/or the second strand or the acting pull may have a vertical, perpendicular and/or downward directed force component. Preferably within the framework of the present invention, a pull and/or a pulling force on only a single strand is also defined as the case that a higher pulling force and/or a higher tension acts on this strand than on the other strand.

The actuating device especially has a first detachable connection in the released position between the first partial structure and the second partial structure. This first connection may be designed as a locking connection. The first connection is detachable with a simultaneous pull on the first strand and on the second strand of the string element when a predetermined pulling force is exceeded. Preferably, the actuating device has, in the locking position, a second connection in addition to the first connection, which is formed by means of the first coupling element and the second coupling element.

The first partial structure is preferably arranged in the released position with no pulling force acting only on the first strand or only on the second strand. In particular, the first partial structure is in the released position with an especially essentially identical pulling force acting simultaneously on the first strand and on the second strand. Preferably, in the released position an especially positive locking connection, in addition to the detachable first connection, is not established between the first partial structure and the second partial structure. Thus, the detachable first connection in the released position can be released, preferably in a destruction-free manner, as a result of which the first partial structure is detachable from the second partial structure. At least one perpendicular, vertical and/or downward directed force component is preferably necessary for separation of the first connection of the first partial structure from the second partial structure. The released position can be arranged between a first locking position and a second locking position. The released position may be designed as a central position here.

The first partial structure is preferably movable, especially pivotable between a released position and two locking positions. In particular, the first partial structure is held in the released position exclusively by a detachable first connection, especially a locking connection, on the second partial structure. In each case, a first coupling element of the first partial structure preferably interacts with a second coupling element of the second partial structure for establishing the especially positive-locking and/or second connection in a locking position. Thus, the first partial structure and/or the second partial structure may each have two first coupling elements and two second coupling elements. In the locking position or because of the especially positive-locking and/or second connection, the two partial structures cannot be detached from one another in a destruction-free manner. In particular, the actuating device, especially the second connection, is designed in a locking position for accommodating high pulling forces, preferably with a pulling weight of more than 2 kg, especially of more than 4 kg, and especially preferably of more than 6 kg.

With an interaction of a first coupling element with a second coupling element, a detachment of the first partial structure from the second partial structure is preferably prevented because of a positive-locking and/or nonpositive-locking connection between the first partial structure and the second partial structure. The first coupling element may be designed as a first locking element, especially a locking hook, here. Furthermore, the second coupling element may be designed as a second locking element. The second locking element is especially designed as corresponding to the first locking element. For example, the second locking element is a locking hook mount. The two first coupling elements of the first partial structure may be facing one another or facing away from one another. Especially in case of first coupling elements facing one another, the second coupling elements of the second partial structure are aligned facing away from one another. Analogously hereto, the second coupling elements may be facing one another when the first coupling elements are facing away from one another.

According to one variant, the first partial structure is pivoted in the direction of the second strand with a pull only on the first strand. The first coupling element adjacent to the first strand interacts in a positive-locking and/or nonpositive-locking manner especially with the second coupling element associated with the first strand. The first partial structure can be pivoted in the direction of the first strand with a pull only on the second strand. The first coupling element adjacent to the second strand interacts in a positive-locking and/or nonpositive-locking manner especially with the second coupling element associated with the second strand. The pivoting motion of the first partial structure is preferably limited by the interaction of the first coupling element with the second coupling element. Because of the pivoting motion of the first partial structure, a respective first coupling element may be guided into a locking position with a respective second coupling element. Preferably, the first partial structure swings back into the released position automatically, especially because of the acting gravity, when a previously pulled strand is released. The released position can be arranged centrally between the two locking positions.

The first partial structure can preferably be moved into a first locking position with a pulling force only on the first strand and/or with a pulling force only on the second strand. The string element may be designed as flexible. The string element is especially a cord, a chain, a ball chain, a belt and/or a strap. Furthermore, the string element may be designed as an endless loop. Preferably, the string element has two string sections aligned essentially parallel to one another, whereby a first string section may be designed as the first strand and a second string section may be designed as a second strand. In the mounted state, the string element or the first strand and the second strand of the first structure may hang downwards, especially vertically. The first strand or the second strand is pulled essentially downwards and/or away from the first partial structure especially for actuating the actuating device for an adjustment of a shading curtain.

The actuating device especially has a basic structure consisting of a first partial structure and a second partial structure, especially for actuating a shading system and/or for actuation with a string element with a first strand and a second strand. The string element is associated with the first partial structure, whereby the first partial structure and the second partial structure can be connected to one another by means of a detachable connection. The, especially first, connection or locking connection is detachable with a simultaneous pull on the first strand and on the second strand when a predetermined pulling force is exceeded. The first partial structure preferably has two webs directed in the direction of the second partial structure, at the free ends of which a first coupling element each is arranged for interacting with a second coupling element of the second partial structure. The webs, the first coupling elements and/or the second coupling elements are especially designed as rigid for establishing a preferably additional, second and/or positive-locking, connection of the first partial structure to the second partial structure with a pull on a single strand.

According to another embodiment, the first partial structure is designed as a lower housing part and/or the second partial structure is designed as an upper housing part. The first partial structure may have at least one housing side with an axle for the rotatable mounting of a first gear wheel. The axle is especially arranged on an inner side of the housing side. Preferably, the first partial structure and/or the second partial structure has two housing sides arranged spaced apart from one another and essentially parallel to one another. Between the inner sides of the two housing sides of the first partial structure and/or of the second partial structure, an axle can, especially in each case, be connected in a nonrotatable manner and/or in one piece with the housing sides.

The first partial structure especially has a first gear wheel and/or the second partial structure has a second gear wheel. The gear wheels of the first partial structure and of the second partial structure especially mesh with each other, when the especially detachable and/or first connection between the first partial structure and the second partial structure is established. Regardless of the position of the first partial structure to the second partial structure, the two gear wheels mesh with each other. A rotary motion of the first gear wheel can be transmitted to a rotary motion of the second gear wheel especially in case of an established additional or second connection between a first coupling element and a second coupling element and/or in a locking position. The first gear wheel preferably has mounts for the string element. Thus, the first gear wheel can be generated into a rotary motion about the mount or the axle of the first partial structure by means of a pulling on the string element. By means of the first gear wheel, the second gear wheel can be displaced into a rotary motion about the axle of the second partial structure.

A pivoting of the first partial structure in relation to the second partial structure preferably takes place because of an interaction of the first gear wheel with the second gear wheel. In particular, a string element meshes with the first gear wheel of the first partial structure and/or is guided at least partly about the first gear wheel. The stronger the first strand or the second strand of this string element is pulled, the stronger is the pivoting of the first partial structure in relation to the second partial structure. Preferably, the first gear wheel is guided and/or pivoted coaxially about the axle of the second gear wheel with a pull on the first strand or the second strand of the string element interacting with the first gear wheel.

The first partial structure especially has an essentially U-shaped side wall, whose legs form webs directed in the direction of the second partial structure. A first coupling element can be arranged at each of the free ends of the webs for interacting with a second coupling element of the second partial structure. Preferably, the width of the side wall defines the distance between the two housing sides of the first partial structure. The first gear wheel can be accommodated within the side wall and/or be partly surrounded or enclosed by the side wall. The second partial structure may likewise have an essentially U-shaped side wall, whereby its legs are facing the first partial structure. The second gear wheel can be arranged within the side wall of the second partial structure. The second coupling elements can be arranged in the area of the free ends of the legs of the U-shaped side wall of the second partial structure. The legs and/or webs of the first partial structure especially have each a first coupling element and the legs and/or webs of the second partial structure have each a second coupling element.

Preferably, the first partial structure and the second partial structure have each a housing side on two sides facing away from each other. The housing sides of the first partial structure and of the second partial structure, which are arranged especially spaced apart from one another and/or parallel to one another, preferably interact for establishing the especially first connection of the first partial structure to the second partial structure, which is detachable with a simultaneous pull on both strands. The housing sides are especially arranged in such a way that they at least partly overlap. For example, the housing sides of the second partial structure may partly overlap the housing sides of the first partial structure. The first partial structure may especially be partly inserted and/or plugged into the second partial structure for establishing the detachable, especially first, connection. Preferably, the first partial structure and/or the second partial structure, especially the housing sides of the first partial structure and/or the housing sides of the second partial structure, may be designed as flexible and/or elastic at least in the area of the detachable, especially first, connection.

According to one variant, the detachable, especially first, connection between the first partial structure and the second partial structure makes possible at least a partial pivoting of the first partial structure about an axle in the area of the second partial structure. Preferably, the pivoting axle corresponds to the position of the axle of the second partial structure for accommodating the second gear wheel. The detachable, especially first, connection especially has an arc-shaped groove and a preferably correspondingly designed arc-shaped groove and a preferably correspondingly designed arc-shaped web, which meshes with the arc-shaped groove for establishing the detachable locking connection. The especially arc-shaped web and the arc-shaped groove are especially inserted into the housing sides of the first partial structure and the second partial structure. For example, an arc-shaped groove is inserted into the outer side of the housing sides of the first partial structure. An especially arc-shaped web can be inserted into the inner side of the housing sides of the second partial structure. The first partial structure can be inserted between the two housing sides of the second partial structure in such a way that the especially arc-shaped webs of the second partial structure lock into the arc-shaped grooves of the first partial structure. The arc-shaped web especially has a markedly lower width and/or arc length than the arc-shaped groove for making possible the pivotability of the first partial structure in relation to the second partial structure.

According to another embodiment, the first coupling elements and the second coupling elements form a first coupling device. In this case, the first coupling device is used for establishing an especially rigid, positive-locking and/or second, connection between the first partial structure and the second partial structure in order to prevent an unintentional detachment of the second partial structure from the second partial structure with a pull on a single strand. In particular, the first coupling device is separated functionally and/or spatially from the detachable, especially first, connection in the released position.

A second coupling device separate from the first coupling device is preferably present for establishing an additional, especially rigid, positive-locking and/or third, connection of the first partial structure with the second partial structure with a pull on a single strand. Thus, a second coupling device, in addition to the first coupling device, acting especially independently of the first coupling device, is provided. Thus, two especially positive-locking connections between the first partial structure and the second partial structure can be simultaneously established with a pull on a single strand. Consequently, it can be guaranteed in an especially reliable manner that the first partial structure is not unintentionally detached from the second partial structure. In addition, a redundancy is consequently achieved, as a result of which the functionality of the actuating device is maintained without restrictions even with a total failure of the first coupling device or of the second coupling device.

Preferably, the second coupling device has at least one essentially T-shaped locking head and at least one essentially T-shaped locking head mount designed corresponding to the locking head. The second coupling device is especially integrated into the housing sides of the first partial structure and of the second partial structure. For example, the locking head is arranged in the first partial structure and the locking mount in the second partial structure or vice versa. The locking head is preferably detachable from the locking head mount with a simultaneous pull on both strands in a contactless manner. A leg of the T-shaped locking head can mesh in a positive-locking manner with a correspondingly designed leg mount of the T-shaped locking head mount with a pull on a single strand. Consequently, the positive-locking connection can be established by means of the second coupling device.

Preferably, a third coupling device is present for establishing an especially positive-locking and/or fourth connection of the first partial structure to the second partial structure with a pull on a single strand or in the locking position of the first partial structure. In this case, the design of the third coupling device may correspond essentially to the design of the second coupling device. The second coupling device and the third coupling device may be arranged on two sides of the actuating device facing away from one another, especially in two housing sides of the first partial structure and of the second partial structure.

A shading system, especially a blind, a pleated blind and/or a roller blind, with an actuating device according to the present invention is especially advantageous. The actuating device makes possible, on the one hand, the transmission of a high pulling force with a selective actuation of the first strand or of the second strand without the risk of an undesired separation of the connection of the first partial structure from the second partial structure. This is made possible by at least one first coupling device, by means of which, for example, a rigid, positive-locking connection can be established between the first partial structure and the second partial structure. In this case, the coupling device is designed separate from a detachable first connection, which holds the first partial structure in the released position on the second partial structure. On the other hand, the detachable first connection between the first partial structure and the second partial structure can be designed in such a way that a low pulling force is sufficient for detaching the first connection with a simultaneous pull on the first strand and on the second strand. The first connection, preferably as a locking connection, between the first partial structure and the second partial structure is detachable in the released position, especially without destruction, with a pulling weight simultaneously on the first strand and the second strand of at least 6 kg. Consequently, for example, the requirement of DIN standard EN 13120 can be met.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
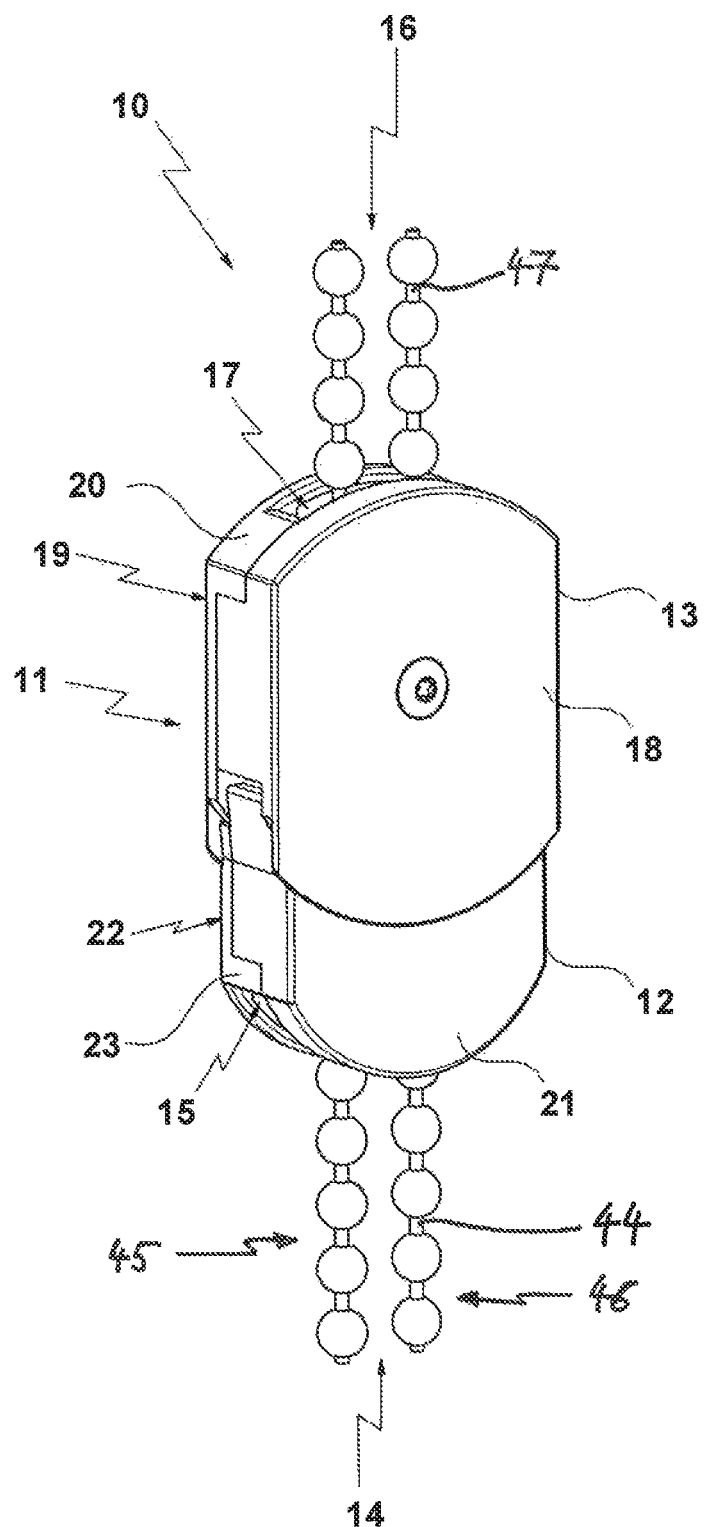
FIG. 1 is a schematic, perspective view of an actuating device according to the present invention.

Referring to the drawings, FIG. 1 shows a schematic, perspective view of an actuating device 10 according to the present invention. In this exemplary embodiment, the actuating device 10 is designed as a chain wheel coupling. The actuating device 10 is used to actuate a shading system, which is not shown here in detail. A string element 44 is provided for this. In this exemplary embodiment, the string element 44 is a ball chain. The string element 44 has a first strand 45 and a second strand 46.

The actuating device 10 has a basic structure 11 that has a first partial structure 12 and a second partial structure 13. Here, the first partial structure 12 is designed as a lower housing part and the second partial structure 13 is designed as an upper housing part. An upper area of the first partial structure 12 is inserted partly into a lower area of the second partial structure 13. The first partial structure 12 has an end 14 facing away from the second partial structure 13. An access opening 15, which has a gap-like design, for example, here, is associated with the end 14. By means of the access opening 15, the string element 44 can be guided as a first string element 44 into and out of the first partial structure 12. During use, the string element 44 is suspended from the access opening 15 and forms a loop, not shown in detail here, at its end facing away from the actuating device 10. The second partial structure 13 has an additional access opening 17 at an end 16 facing away from the first partial structure 12. The additional access opening 17 has a gap-like design, for example, here and is used for guiding an additional or second string element 47 into or out of the second partial structure 13.

The second partial structure 13 has housing sides 18, 19 arranged parallel to one another and spaced apart from one another. A side wall 20 is arranged between the housing sides 18, 19 in the area of the outer circumference of the housing sides 18, 19. The side wall 20 of the second partial structure 13 has an essentially U-shaped cross section.

Furthermore, the first partial structure 12 has two housing sides 21, 22 arranged parallel to one another and spaced apart from one another. A side wall 33, which has an essentially U-shaped cross section, of the first partial structure 12 is arranged in the area of the outer circumference of the housing sides 21, 22 and spaces the housing sides 21 and 22 apart from one another.

In this exemplary embodiment, the width of the side wall 23 of the first partial structure 12 is smaller than the width of the side wall 20 of the second partial structure 13. Essentially, the difference of the widths between the side walls 20, 23 corresponds approximately to the sum of the thickness of the two housing sides 18, 19. In addition, the side wall 20 of the second partial structure 13 has a setback in relation to the housing sides 18, 19 in an area facing the first partial structure 12. Consequently, a partial pushing in of the first partial structure 12 into an area facing away from the end 16 of the second partial structure 13 as shown is made possible.

Figure 2:
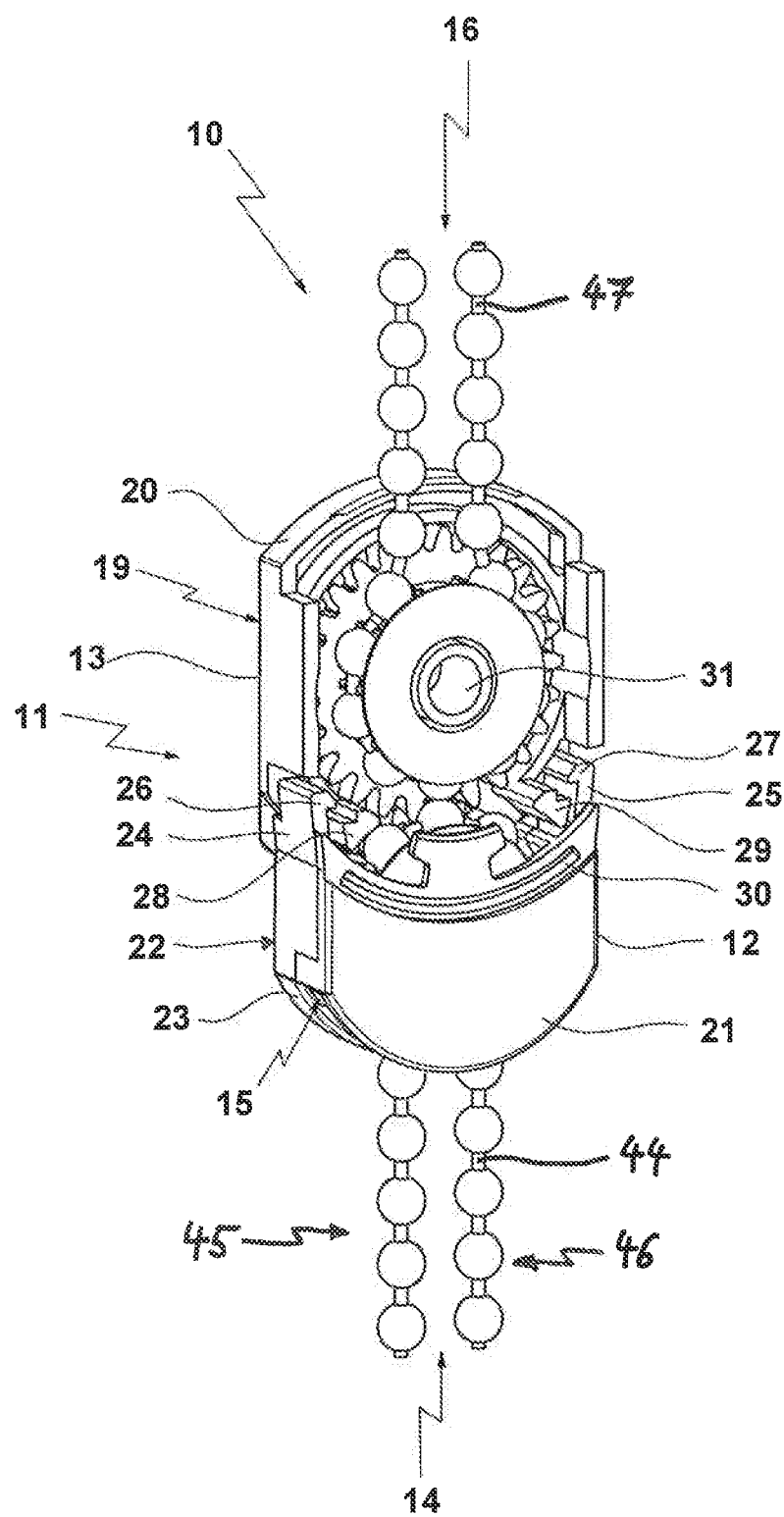
FIG. 2 is a schematic, partially open, perspective view of the actuating device according to FIG. 1.

FIG. 2 shows a schematic, perspective, partially open view of the actuating device 10 according to FIG. 1. A part with the housing side 18 is removed from the second partial structure 13, as a result of which the second partial structure 13 is opened and the inner structure can be seen.

The first partial structure 12 has two webs 24, 25 aligned in the direction of the second partial structure 13 and essentially parallel to one another. In this exemplary embodiment, the webs 24, 25 are designed as legs of the essentially U-shaped side wall 23 of the first partial structure 12. A first coupling element 26 or 27 each is arranged at the free ends of the webs 24, 25 facing the second partial structure 13. Here, the first coupling elements 26, 27 are designed as locking hooks. The locking hooks 26, 27 are aligned facing one another.

The second partial structure 13 has second coupling elements 28, 29, which are each designed for interacting with one of the first coupling elements 26, 27, in an area facing the first partial structure 12. Thus, the second coupling elements 28, 29 in this exemplary embodiment are designed as locking hook mounts. The second coupling element 28 is associated with the first coupling element 26 and the second coupling element 29 is associated with the first coupling element 27. The first coupling elements 26, 27 and the second coupling elements 28, 29 form a first coupling device and are designed as rigid.

According to the view according to FIG. 2, the first partial structure 12 is located in a released position, in which neither of the first coupling elements 26, 27 interacts with a second coupling element 28, 29. Rather, the first coupling elements 26, 27 are shown in the released position spaced apart from the second coupling elements 28, 29 in such a way that the two first coupling elements 26, 27 can be directed in a contactless manner past the second coupling elements 28, 29 for detaching the first partial structure 12 from the second partial structure 13. Thus, the first coupling elements 26, 27 in the released position do not mesh with the second coupling elements 28, 29.

The first partial structure 12 has a groove 30 in an area facing the second partial structure 13. The groove 30 has an arc-shaped design and is embedded into the outer side of the housing side 21 of the first partial structure 12. A groove designed analogously hereto is also located in the housing side 22 of the first partial structure 12. The center of the radius of the arc-shaped groove 30 corresponds to the center of an axle 31, which is associated with the second partial structure 13. The inner sides of the housing sides 18, 19 of the second partial structure 13 have a web, not shown in detail here, which meshes with the groove 30 for establishing a detachable locking connection. The web is designed as sufficiently flexible for establishing and detaching the locking connection.

In the released position shown here, the web is arranged essentially centrally in the groove 30. The arc length of the groove 30 is greater than the width or the arc length of the web. As a result of this, the locking connection makes possible a pivoting of the first partial structure 12 about the center or the central axis of the axle 31 of the second partial structure 13.

Figure 3:
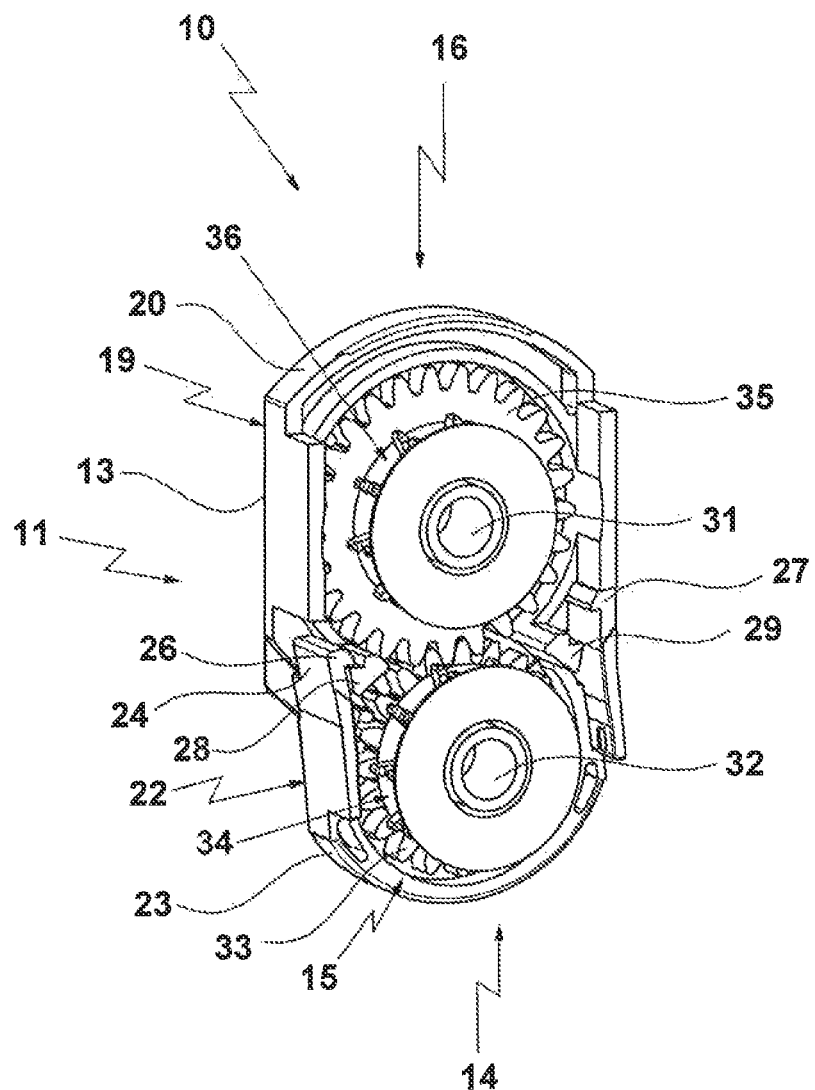
FIG. 3 is a schematic, open, perspective view of the actuating device according to FIGS. 1 and 2.

FIG. 3 shows a schematic, perspective, open view of the actuating device 10. A part with the housing side 18 is removed from the second partial structure 13 and a part with the housing side 21 is removed from the first partial structure 12, as a result of which the two partial structures 12, 13 are open and their inner structure can be seen.

According to this view, the first partial structure 12 is pivoted into a first locking position. In this first locking position, the first coupling element 26 meshes with the second coupling element 28 for establishing a positive-locking connection. As an alternative to the first locking position shown here, the first partial structure 12 can be pivoted in such a way that the first coupling element 27 interacts with the second coupling element 29 for establishing a positive-locking connection, whereby the first partial structure 12 is then located in a second locking position. Because of the positive-locking connection between the rigid first coupling element 26 and the rigid second coupling element 28 in the first locking position or between the rigid first coupling element 27 and the rigid second coupling element 29 in the second locking position, an undesired detachment of the first partial structure 12 from the second partial structure 13 with a pull on a single strand of a string element, not shown here in detail, is prevented.

The first partial structure 12 has an axle 32, which is used for the rotatable mounting of a first gear wheel 33. The first gear wheel 33 is connected in a nonrotatable manner to a coaxially arranged chain wheel 34. By means of a string element 44, interacting with the chain wheel 34 and not shown in detail here for better clarity, the first gear wheel 33 can thus be displaced into a rotation about the axle 32. The first gear wheel 33 is in active connection with a second gear wheel 35, which is associated with the second partial structure 13. The second gear wheel 35 is mounted rotatably about the axle 31 of the second partial structure 13. In this exemplary embodiment, the second gear wheel 35 is connected in a nonrotatable manner to a coaxially arranged chain wheel 36. Thus, a movement of a first string element 44, which is guided about the first gear wheel 33, can be transmitted to a second string element 47, which is guided about the chain wheel 36.

The first gear wheel 33 and the second gear wheel 35 are actively connected to one another in such a way that a pivoting of the first partial structure 12 can be brought about because of the interaction between the two gear wheels 33, 35. The stronger the first strand 45 or the second strand 46 of the first string element 44 is pulled, the stronger is the first partial structure 12 pivoted in relation to the second partial structure 13. In this case, the first gear wheel 33 is coaxially guided about the outer circumference of the second gear wheel 35 or the axle 31.

The second string element 47 may be connected to a drive for driving a shading system. As an alternative, the second gear wheel 35 may have no chain wheel and instead be connected directly to a drive axle.

Figure 4:
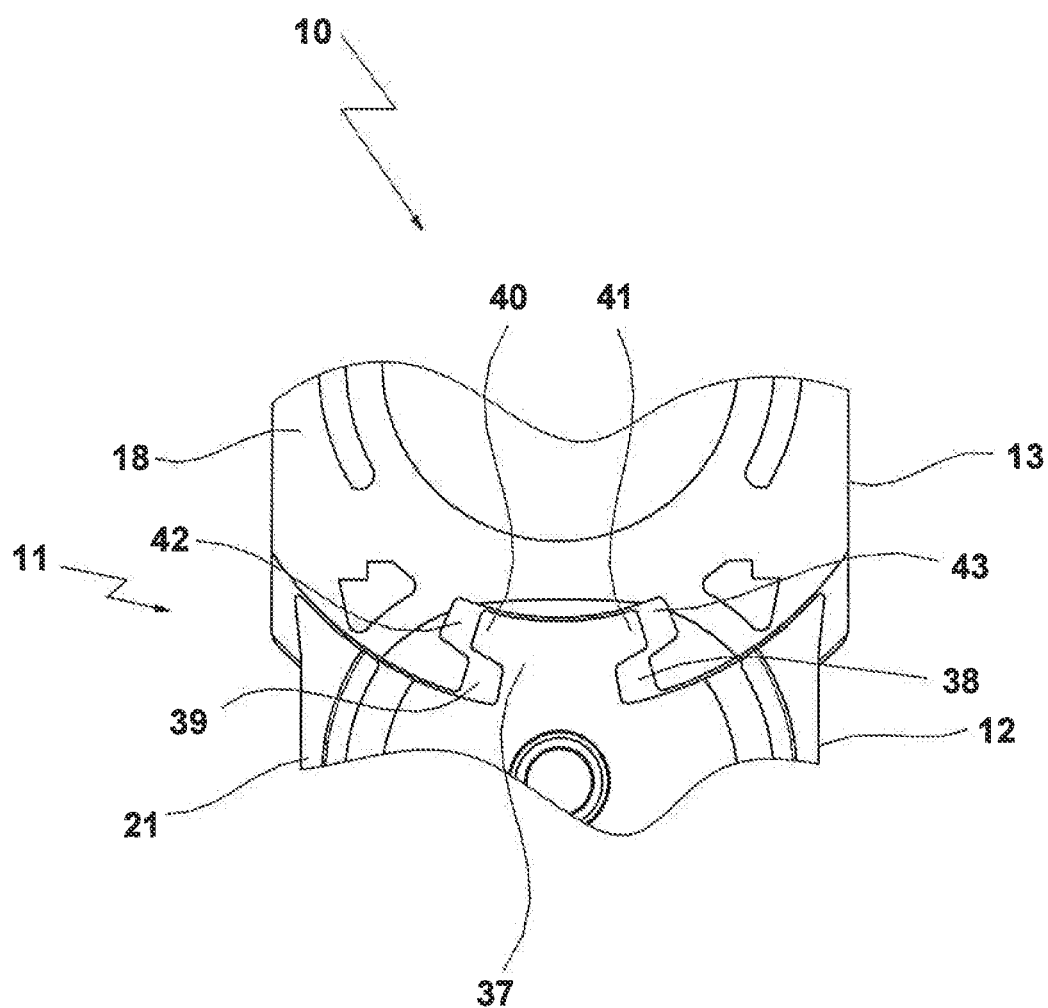
FIG. 4 is a schematic, cut partial sectional view of an actuating device according to the present invention.

FIG. 4 shows a schematic, cut partial section of an actuating device 10 according to the present invention. The first partial structure 12 has a third coupling element 37 at an end facing the second partial structure 13. The third coupling element 37 is designed for interacting with a fourth coupling element 38 of the second partial structure 13. The third coupling element 37 and the fourth coupling element 38 form a second coupling device. In this exemplary embodiment, the third coupling element 37 is designed as an essentially T-shaped locking head. The fourth coupling element 38 is designed here, for example, as an essentially T-shaped locking head mount. The fourth coupling element 38 is arranged at an end of the second partial structure 13 facing the first partial structure 12. In this exemplary embodiment, the third coupling element 37 is arranged in the plane of the housing surface 18 and the fourth coupling element 38 is arranged in the plane of the housing surface 21.

The third coupling element 37 and the fourth coupling element 38 are arranged essentially centrally to a conceived vertical axis of the first partial structure 12 and of the second partial structure 13. Furthermore, the third coupling element 37 and the fourth coupling element 38 are designed in such a way that the third coupling element 37 can be guided in a contactless manner from the fourth coupling element 38 in the released position, shown here, of the first partial structure 12 in relation to the second partial structure 13. Thus, in the released position, the third coupling element 37 and the fourth coupling element 38 do not mesh with one another. For this, a base or base opening 39 of the fourth coupling 38 is designed as somewhat wider than the T-shaped locking head of the third coupling element 37. The third and fourth coupling elements 37, 38 are designed as rigid.

In a locking position, not shown in detail here, of the first partial structure 12, a leg 40 or 41 of the third coupling element 37 meshes with a correspondingly designed leg mount 42 or 43. A positive-locking connection between the first partial structure 12 and the second partial structure 13 can thus be established in the locking position.

The third coupling element 37 is arranged in the area of the housing side 21 of the first partial structure 12 and the fourth coupling element 38 in the area of the housing side 18 of the second partial structure 13. Analogous to the third coupling element 37 and the fourth coupling element 38, a fifth coupling element designed analogously hereto and a sixth coupling element may be provided, which are arranged in the area of the housing sides 19, 22 and thus form a third coupling device designed analogously to the second coupling device.

Figure 5:
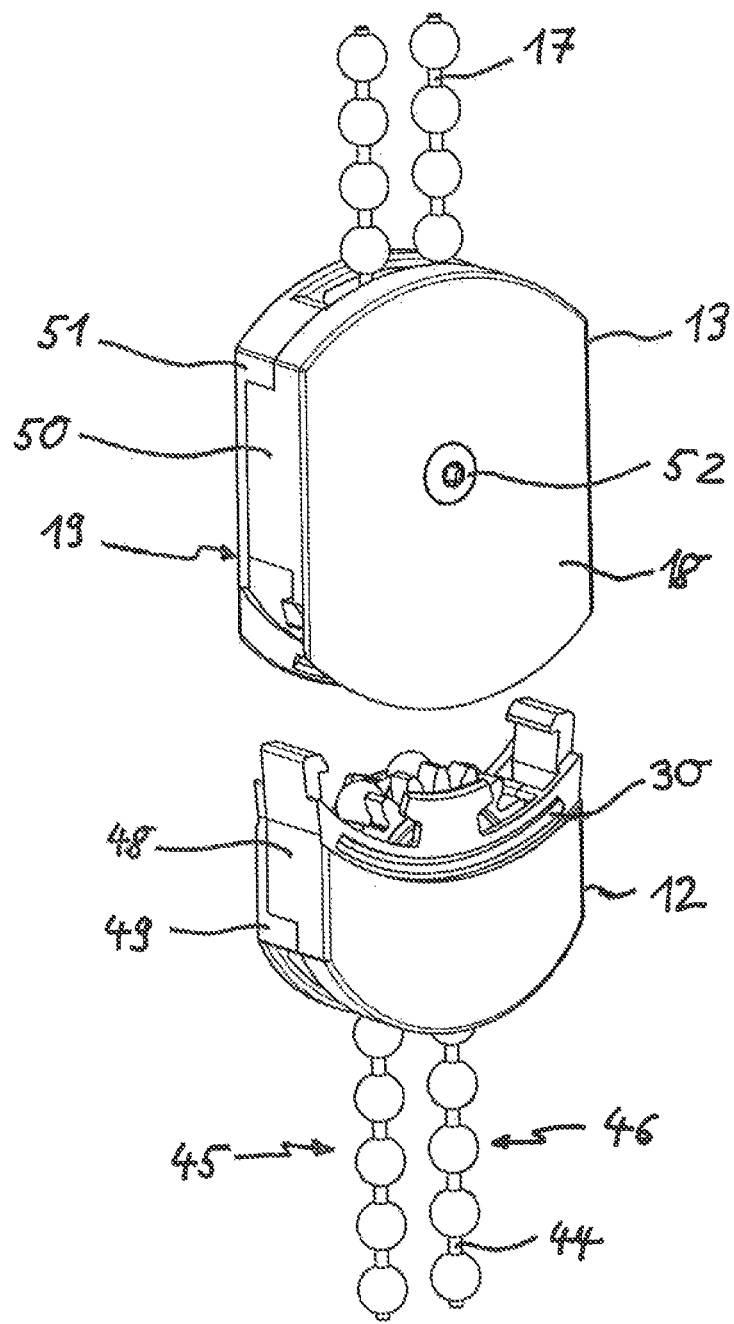
FIG. 5 is a schematic, perspective view of the actuating device according to the present invention according to FIG. 1 with a detached first partial structure.

FIG. 5 shows a schematic, perspective view of the actuating device 10 according to the present invention according to FIG. 1 with a detached first partial structure 12. The first partial structure 12 has two assembled housing halves 48, 49. The housing halves 48, 49 are connected to one another by means of a locking connection in this exemplary embodiment.

The second partial structure 13 has two assembled housing halves 50, 51, which are connected to one another by means of a separate fixing element 52 in this exemplary embodiment. The fixing element 52 may be used as a securing means for a locking connection of the two housing halves 50, 51. The fixing element 52 is designed here as a screw, which is guided through the axle 31. In this case, the axle 31 according to FIGS. 2 and 3 is designed as a hollow axle. By means of the fixing element 52, an especially reliable connection between the housing halves 50, 51 can be established. As an alternative or in addition, the first partial structure 12 may have an analogously designed fixing element.

The housing halves 48, 49, 50, 51 have different designs in this exemplary embodiment. As an alternative, the housing halves 48, 49 of the first partial structure 12 or the housing halves 50, 51 of the second partial structure 13 may have an identical design.

In the released position, the first partial structure 12 is in active connection or meshes with the second partial structure 13 by means of the groove 30. With a sufficiently strong pull or essentially equally strong pull on both strands 45, 46 of the string element 44, for example, due to the gravity of a child suspended in a loop of the string element 44, this single connection is detached from the second partial structure 13 by a bending up of the housing sides 18, 19 at least in the area of the groove 30, as a result of which the first partial structure 12 is completely detached from the second partial structure 13 as shown here.

Figure 6:
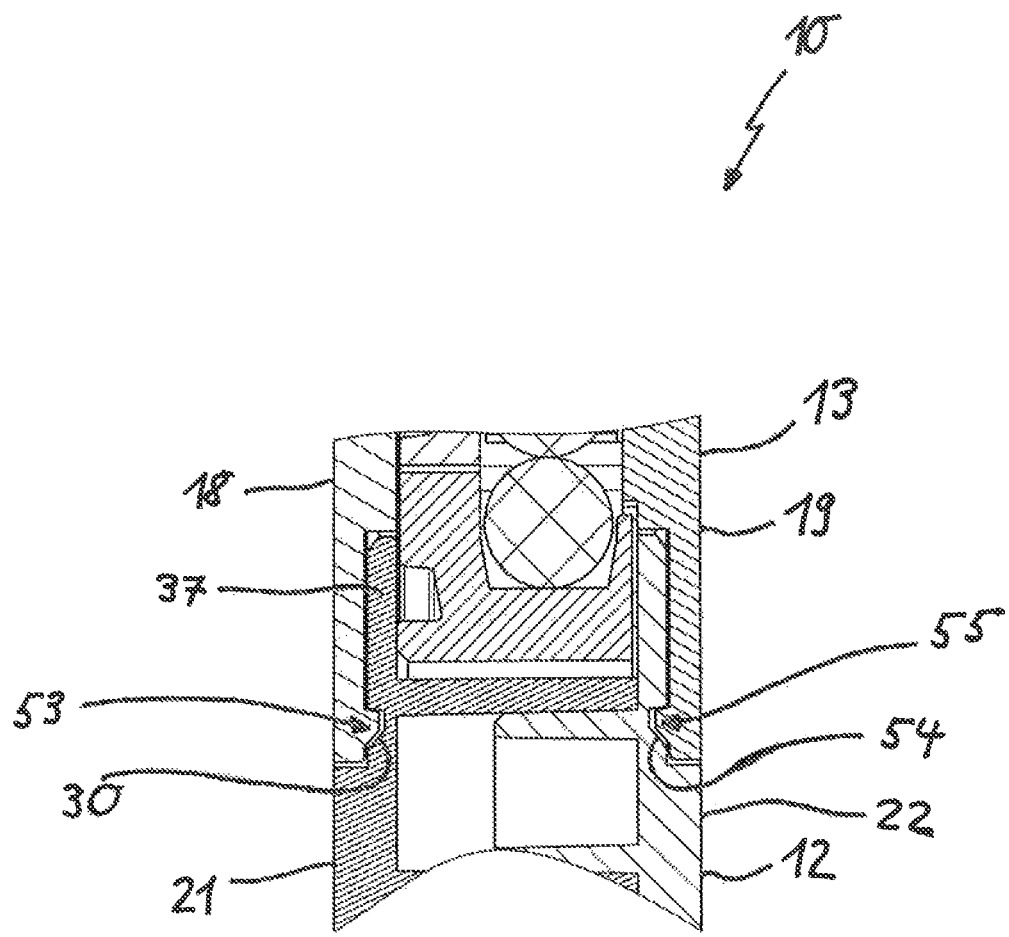
FIG. 6 is another sectional view of the schematic, cut partial section according to FIG. 4.

FIG. 6 shows another sectional view of the schematic, cut partial section according to FIG. 4. The single detachable connection between the first partial structure 12 and the second partial structure 13 in the released position can be seen in this view. This detachable active connection is designed as a detachable locking connection in this exemplary embodiment. Here, a web 53 of the second partial structure 13 meshes with the groove 30 of the first partial structure 12. The groove 30 is inserted into a front side of the housing side 21 of the first partial structure 12. The web 53 is arranged on the inner side of the housing side 18 of the second partial structure 13.

Analogously hereto, an additional web 55 of the second partial structure 13 meshes with an additional groove 54 of the first partial structure 12. The additional groove 54 is inserted into a front side of the housing side 22 of the first partial structure 12. The additional web 55 is arranged on an inner side of the housing side 19 of the second partial structure 13.

As an alternative, the detachable position between the first partial structure 12 and the second partial structure 13 in the released position may have at least one pin or a plurality of pins instead of a web 53, 55. The pins or the webs 53, 55 may have a flexible design in order to guarantee a detachment of the first partial structure 12 in the released position with a sufficient pulling force on both strands 45, 46. As an alternative or in addition, the housing sides 18, 19 may be flexible or elastic in the area of the locking connection or of the webs 53, 55.

While specific embodiments of the invention have been shown and described in detail to illustrate the application of the principles of the invention, it will be understood that the invention may be embodied otherwise without departing from such principles.

APPENDIX

List of Reference Numbers

| | |
|---|---|
| 10 | Actuating device |
| 11 | Basic structure |
| 12 | First partial structure |
| 13 | Second partial structure |
| 14 | End |

APPENDIX-continued

List of Reference Numbers

| | |
|---|---|
| 15 | Access opening |
| 16 | End |
| 17 | Access opening |
| 18 | Housing side |
| 19 | Housing side |
| 20 | Side wall |
| 21 | Housing side |
| 22 | Housing side |
| 23 | Side wall |
| 24 | Web |
| 25 | Web |
| 26 | First coupling element |
| 27 | First coupling element |
| 28 | Second coupling element |
| 29 | Second coupling element |
| 30 | Groove |
| 31 | Axle |
| 32 | Axle |
| 33 | First gear wheel |
| 34 | Chain wheel |
| 35 | Second gear wheel |
| 36 | Chain wheel |
| 37 | Third coupling element |
| 38 | Fourth coupling element |
| 39 | Base opening |
| 40 | Leg |
| 41 | Leg |
| 42 | Leg mount |
| 43 | Leg mount |
| 44 | String element |
| 45 | First strand |
| 46 | Second strand |
| 47 | Additional string element |
| 48 | Housing half |
| 49 | Housing half |
| 50 | Housing half |
| 51 | Housing half |
| 52 | Fixing element |
| 53 | Web |
| 54 | Groove |
| 55 | Web |

What is claimed is:

1. An actuating device for a shading system, the actuating device comprising:
   a string element comprising a first strand and a second strand;
   a first partial structure;
   a second partial structure, the first partial structure being detachably fastened to the second partial structure, whereby the first partial structure is detachable from the second partial structure with a simultaneous pull on the first strand and on the second strand of the string element when exceeding a predetermined pulling force;
   a first coupling element associated with the first partial structure;
   a second coupling element associated with the second partial structure, the first coupling element, in a locking position, meshing with the second coupling element, whereby the first partial structure, with a pull individually one of on the first strand and on the second strand is pivoted into the locking position, and the first partial structure, with a simultaneous pulling on the first strand and on the second strand of the string element, is pivoted into a release position, the first partial structure being detachable from the second partial structure in the release position;
   a detachable connection between the first partial structure and the second partial structure, whereby the first partial structure and the second partial structure are connected to one another in the release position by the detachable connection, the first coupling element, in the release position, does not mesh with the second coupling element, and in the locking position with an interaction of the first coupling element with the second coupling element, a detachment of the first partial structure from the second partial structure is prevented by a positive-locking connection between the first coupling element and the second coupling element; and
   another first coupling element associated with the first partial structure;
   another second coupling element associated with the second partial structure wherein the first coupling elements and the second coupling elements form a first coupling device; and
   a second coupling device, separate from the first coupling device for establishing an additional connection of the first partial structure with the second partial structure in a locking position with a pull on a single strand, whereby two connections between the first partial structure and the second partial structure are simultaneously established with the pull on the pull on the single strand.

2. An actuating device in accordance with claim 1, wherein the first partial structure is arranged in the release position, when an especially equal, pulling force acts simultaneously on the first strand and on the second strand, whereby the release position is between a first locking position and a second locking position.

3. An actuating device in accordance with claim 1, further comprising another connection wherein:
   the detachable connection between the first partial structure and the second partial structure in the release position comprises a first connection, which is detachable with a simultaneous pull on the first strand and on the second strand when exceeding a predetermined pulling force; and
   in the locking position the other connection comprises a second connection in addition to the first connection, the second connection comprising the first coupling element and the second coupling element;
   at least one of the first coupling element comprises a first locking element comprises of a locking hook and the second coupling element comprises a second locking element corresponding to the first locking element and is comprised of a locking hook mount.

4. An actuating device in accordance with claim 1, wherein with a pull only on the first strand, the first partial structure is pivoted in a direction of the second strand, and the first coupling element adjacent to the first strand interacts with the second coupling element associated with the first strand in at least one of a positive-locking manner and nonpositive-locking manner.

5. An actuating device in accordance with claim 1, wherein the first partial structure is pivoted in the direction of the first strand with a pull only on the second strand, and the first coupling element adjacent to the second strand interacts with the second coupling element associated with the second strand in a positive-locking manner and nonpositive-locking manner.

6. An actuating device in accordance with claim 1, wherein at least one of the first partial structure comprises a lower housing part and the second partial structure comprises an upper housing part, wherein:
   the first partial structure has at least one housing side with an axle for the rotatable mounting of a first gear wheel;

the first partial structure has an essentially U-shaped side wall with legs forming webs directed in a direction of the second partial structure; and free ends of the legs have said first coupling element each arranged for interacting with said second coupling element of the second partial structure.

7. An actuating device in accordance with claim 1, wherein:

each of the first partial structure and the second partial structure has opposing housing sides, the opposing housing sides of the first partial structure facing away from one another, the opposing housing sides of the second partial structure facing away from one another;

the housing sides of the first partial structure and the housing sides of the second partial structure interact for establishing the detachable connection of the first partial structure with the second partial structure with a simultaneous pull on both strands.

8. An actuating device in accordance with claim 1, wherein:

the detachable connection between the first partial structure and the second partial structure in the release position makes possible at least a partial pivoting of the first partial structure about an axle in the area of the second partial structure; and the detachable connection has an arc-shaped groove and a correspondingly designed, especially arc-shaped web, which meshes with the arc-shaped groove for establishing the detachable connection.

9. An actuating device in accordance with claim 1, wherein:

the second coupling device has at least one essentially T-shaped locking head and at least one essentially T-shaped locking head mount designed corresponding to the locking head, and at least one of the locking head is detachable from the locking head mount with a simultaneous pull on both strands in a contactless manner and one leg of the locking head meshes in a positive-locking manner with a correspondingly designed leg mount of the locking head mount with a pull on a single strand.

10. A shading system comprising:

one of a blind, a pleated blind and a roller blind; and an actuating device for actuation of the shading system with a string element with a first strand and a second strand, the actuating device comprising:

a first partial structure;

a second partial structure, the first partial structure being detachably fastened to the second partial structure, whereby the first partial structure is detachable from the second partial structure with a simultaneous pull on the first strand and on the second strand of the string element when exceeding a predetermined pulling force;

a first coupling element associated with the first partial structure;

a second coupling element associated with the second partial structure, the first coupling element, in a locking position, meshing with the second coupling element, whereby the first partial structure, with a pull individually one of on the first strand and on the second strand is pivoted into the locking position, and the first partial structure, with a simultaneous pulling on the first strand and on the second strand of the string element, is pivoted into a release position, the first partial structure being detachable from the second partial structure in the release position;

a detachable connection between the first partial structure and the second partial structure, whereby the first partial structure and the second partial structure are connected to one another in the release position by the detachable connection, the first coupling element, in the release position, does not mesh with the second coupling element, and in the locking position with an interaction of the first coupling element with the second coupling element, a detachment of the first partial structure from the second partial structure is prevented by a positive-locking connection between the first coupling element and the second coupling element;

another first coupling element associated with the first partial structure;

another second coupling element associated with the second partial structure wherein the first coupling elements and the second coupling elements form a first coupling device; and a second coupling device, separate from the first coupling device for establishing an additional connection of the first partial structure with the second partial structure in a locking position with a pull on a single strand, whereby two connections between the first partial structure and the second partial structure are simultaneously established with the pull on the pull on the single strand.

11. A shading system in accordance with claim 10, wherein the first partial structure is arranged in the release position, when an especially equal, pulling force acts simultaneously on the first strand and on the second strand, whereby the release position is between a first locking position and a second locking position.

12. A shading system in accordance with claim 10, further comprising another connection wherein:

the detachable connection between the first partial structure and the second partial structure in the release position comprises a first connection, which is detachable with a simultaneous pull on the first strand and on the second strand when exceeding a predetermined pulling force; and in the locking position the other connection comprises a second connection in addition to the first connection, the second connection comprising the first coupling element and the second coupling element;

at least one of the first coupling element comprises a first locking element comprises of a locking hook and the second coupling element comprises a second locking element corresponding to the first locking element and is comprised of a locking hook mount.

13. A shading system in accordance with claim 10, wherein with a pull only on the first strand, the first partial structure is pivoted in a direction of the second strand, and the first coupling element adjacent to the first strand interacts with the second coupling element associated with the first strand in at least one of a positive-locking manner and nonpositive-locking manner.

14. A shading system in accordance with claim 10, wherein the first partial structure is pivoted in the direction of the first strand with a pull only on the second strand, and the first coupling element adjacent to the second strand interacts with the second coupling element associated with the second strand in at least one of a positive-locking manner and nonpositive-locking manner.

15. A shading system in accordance with claim 10, wherein at least one of the first partial structure comprises a lower housing part and the second partial structure comprises an upper housing part, wherein:

the first partial structure has at least one housing side with an axle for the rotatable mounting of a first gear wheel;

the first partial structure has an essentially U-shaped side wall with legs forming webs directed in a direction of the second partial structure; and free ends of the legs have said first coupling element each arranged for interacting with said second coupling element of the second partial structure.

16. A shading system in accordance with claim 10, wherein:

each of the first partial structure and the second partial structure has opposing housing sides, the opposing housing sides of the first partial structure facing away from one another, the opposing housing sides of the second partial structure facing away from one another;

the housing sides of the first partial structure and the housing sides of the second partial structure interact for establishing the detachable connection of the first partial structure with the second partial structure with a simultaneous pull on both strands.

17. A shading system in accordance with claim 10, wherein:

the detachable connection between the first partial structure and the second partial structure in the release position makes possible at least a partial pivoting of the first partial structure about an axle in the area of the second partial structure; and the detachable connection has an arc-shaped groove and a correspondingly designed, especially arc-shaped web, which meshes with the arc-shaped groove for establishing the detachable connection.

18. A shading system in accordance with claim 10, wherein:

the second coupling device has at least one essentially T-shaped locking head and at least one essentially T-shaped locking head mount designed corresponding to the locking head, and at least one of the locking head is detachable from the locking head mount with a simultaneous pull on both strands in a contactless manner and one leg of the locking head meshes in a positive-locking manner with a correspondingly designed leg mount of the locking head mount with a pull on a single strand.

19. An actuating device for a shading system, the actuating device comprising:

a string element comprising a first strand and a second strand;

a first partial structure;

a second partial structure;

a first coupling element associated with the first partial structure;

a second coupling element associated with the second partial structure, the first partial structure being movable, relative to the second partial structure, between a release position and a lock position, wherein the first partial structure is pivoted via a force applied on one of the first strand and on the second strand such that the first partial structure is pivoted into the lock position, the first coupling element being in direct contact with the second coupling element with the first partial structure in the lock position and the first partial structure being connected to the second partial structure with the first partial structure in the lock position, wherein a detachment of the first partial structure from the second partial structure is prevented by a positive-locking connection between the first coupling element and the second coupling element with the first partial structure in the lock position, the first partial structure pivoting from the lock position to the release position via another force simultaneously applied on each of the first strand and the second strand, the first coupling element being located at a spaced location from the second coupling element in the release state and the first partial structure is detachably connected to the second partial structure with the first partial structure in the release position, wherein the first partial structure is detachable from the second partial structure with the first partial structure in the lock position with a simultaneous pull on the first strand and on the second strand of the string element when exceeding a predetermined pulling force.

20. An actuating device in accordance with claim 19, further comprising:

another first coupling element associated with the first partial structure;

another second coupling element associated with the second partial structure wherein the first coupling elements and the second coupling elements form a first coupling device; and a second coupling device, separate from the first coupling device for establishing an additional connection of the first partial structure with the second partial structure in a locking position with a pull on a single strand.

\* \* \* \* \*